May 21, 1940.  J. P. SMITH ET AL  2,201,457

MOISTUREPROOF SAUSAGE CASING AND METHOD OF MAKING SAME

Filed May 3, 1937

Inventors:
John Paul Smith,
William Franklin Henderson
By Zabel, Carlson, Gritzbaugh & Wells,
Attorneys Patented May 21, 1940

2,201,457

UNITED STATES PATENT OFFICE 2,201,457

MOISTUREPROOF SAUSAGE CASING AND METHOD OF MAKING SAME

John Paul Smith and William Franklin Henderson, Chicago, Ill., assignors to The Visking Corporation, Chicago, Ill., a corporation of Virginia Application May 3, 1937, Serial No. 140,318

12 Claims. (Cl. 99—176)

This invention relates to coated fibrous sheet and web material; it includes wrapping sheets and also casings or tubings ordinarily used as containers for alimentary products, and more particularly, moistureproof casings for sausage meats and sausage compositions.

Some sausage meats and sausage compositions and especially liver sausage tend to deteriorate rapidly due to the loss of moisture by evaporation through the pores of the casings containing them. In the past, certain animal intestines, such as hog "bungs," have been used as sausage casings. These casings, even though containing a natural lining of fat, did not, however, prevent the evaporation of moisture from the alimentary compositions and hence the compositions deteriorated in time sufficiently to make them unedible and unsalable. This objection is also present, at least to some extent, in the artificial casings made from material such as, for example, cellulose derivatives and the like.

In accordance with our invention we have found that a satisfactory casing can be produced by applying a thin sheet of moistureproof and waterproof material to thin bibulous paper and then applying a suitable coating of some cellulose derivative to the other side of the paper so that in effect, the casing comprises a reenforced sheet of cellulose derivative having a coating or film of moistureproof and waterproof material on one side thereof.

In carrying out some forms of the invention, a thin layer of moistureproof and waterproof material is formed from some suitable thermoplastic composition as, for example, one containing a relatively moistureproof plastic such as a vinyl resin, rubber or a rubber derivative; or a mixture of one or more of the foregoing materials with a wax, or a mixture of a cellulose derivative and a wax. The layer of moistureproof material is pressed or calendered lightly against one side of a thin, bibulous paper reenforcing sheet and is caused to firmly adhere to the paper substantially at its surface and without any or substantially no penetration of the thermoplastic material into the pores or interstices of the paper. A portion of the side of the paper to which the thermoplastic layer is adhered is left uncovered to provide a margin to which an adhesive material is applied to facilitate the formation of a strong seam when the paper is formed into a tube. The paper sheet with the moistureproof layer firmly attached to it is now formed into a tube, preferably with the moistureproof layer on the inside, and the paper portion of the tube is treated with a solution of viscose or other suitable cellulose derivative having a relatively low viscosity. When the interstices of the paper have been filled with the viscose solution and a coating of the solution is formed thereon, the tube is subjected to the action of a coagulating or precipitating and regenerating bath or baths to regenerate the cellulose, and is washed and dried.

The invention also contemplates the application of a suitable moistureproof and waterproof material to the known artificial casings such as, for example, the artificial casings produced in accordance with the invention set forth in the prior co-pending applications, Serial Nos. 25,686, 43,409 and 86,638, filed June 8, 1935, October 3, 1935, and June 22, 1936, respectively, by John Paul Smith.

The casing embodying our invention is clearly shown in the drawing, wherein—

Figure 1:
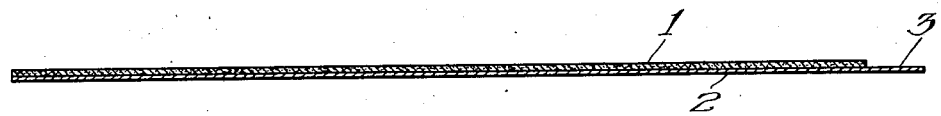
Figure 1 is a transverse sectional view of the composite moistureproof paper prior to impregnation and prior to being formed into tubular or casing form, with the webs exaggerated in thickness for clarity.

The moistureproof material embodying our invention may be suitably any material having moistureproof and waterproof properties, and preferably a thermoplastic material capable of being formed into a thin, flexible, non-tacky, odorless, moistureproof and waterproof sheet. The sheet must possess the ability to resist the diffusion of water vapor, be capable of being rendered sufficiently adhesive to enable it to be adhered to another sheet or layer and at the same time it must be sufficiently flexible to permit it to withstand creasing and folding without substantially impairing its moistureproofness and waterproofness.

A preferred moistureproof composition embodying our invention comprises a base, a wax or wax-like material and, if necessary, a plasticizer. If desired, the composition may include a small amount of a gum or resin to impart adhesiveness thereto and, if necessary, during the compounding operation to be described, a small amount of a substance may be added to reduce the tendency of the composition to adhere to the compounding rolls. These materials may be combined in varying proportions, depending, of course, upon the qualities desired in the final composition. In general, the base may vary from about 25 to 30% to about 75 to 80% of the composition or higher; the wax or wax-like material may vary from about 5 to 7% to about 20 to 25% or higher; and the plasticizer, if necessary, may vary from about 10 to 45% or higher. The other ingredients, if used, may each vary from about 0.1 of 1% to about 5%. Satisfactory moistureproof material has been obtained by combining relatively small amounts of rubber or rubber-like material with a wax; or by combining a major portion of a vinyl resin with a wax; or by plasticizing any of the vinyl resins and using the plasticized vinyl resin as the moistureproof material.

The base material used in carrying out our invention may be any tough organic plastic as for example caoutchouc, rubber, balata or polymerized chloroprene; a rubber derivative such as chlorinated rubber, rubber hydrochloride, or a rubber condensation product obtainable by reacting rubber with a stannic halide or chlorostannic acid; vinyl resins such as polymerized vinyl chloride, vinyl acetate or mixtures thereof; mixtures of polymerized vinyl alcohol with vinyl resins; polystyrene; polymerized acrylic acid and its derivatives such as polymerized methyl methacrylate; or it may be suitable high viscosity cellulosic derivatives, such as high viscosity cellulose ethers or esters as for example, ethyl cellulose, dibenzyl cellulose, methyl cellulose, cellulose acetate and the like. The cellulose derivatives used in accordance with our invention are characterized by their heat stability, workability at relatively low temperatures, thermoplasticity, ready miscibility with most plasticizers, compatability with a large number of resins and waxes, and especially for their low moisture absorption and very high resistance to passage of water or water vapor.

The wax employed in accordance with our invention may suitably be any of the relatively high melting point, odorless and colorless waxes. Thus, for example, paraffin or equivalent waxes may be used. Other waxes such as, for example, bees wax, candelilla, spermaceti, ceresin and the like or equivalent wax-like materials such as, for example, chlorinated naphthalene or the like may be used. These wax or wax-like materials may be used either singly or in admixture with one another or with paraffin wax.

The plasticizers used in accordance with our invention may be suitably any one or more of the well known plasticizers, preferably odorless, such as tri-cresyl phosphate, tri-phenyl phosphate, di-butyl phthalate, di-amyl phthalate, butyl phthalyl butyl glycollate, or the liquid or semi-solid chlorinated diphenyls.

The agent for imparting a slight adhesiveness to the thermoplastic composition may be suitably any of the well known natural or synthetic gums or resins such as ester gum, dammar gum, gum mastic, rosin, or the copal resins. Stearic acid or other suitable material may be used in the composition to prevent sticking of the composition to the rolls during compounding.

The fibrous material which we prefer to employ is paper. In the manufacture of our coated tube we preferably desire to use a very thin tissue-like paper produced from long fibres. Papers well known on the market, such as Japanese papers known as Yoshino paper, rice paper, and the like, are well adapted to the purpose. The papers which it is preferred to use are extremely attenuated and porous, being commonly of a thickness varying perhaps from .001" to .0025". Moistureproofing compositions will adhere tenaciously to this type of paper and the paper will also impregnate readily and retain large quantities of film forming compositions such as cellulose derivative compositions to produce a composite sheet of high strength and flexibility.

The following illustrative compositions are examples of compositions which have been successfully used by us to form the moistureproof layer of the casing embodying our invention. It is, of course, to be understood that our invention is not restricted to these specific examples since other suitable moistureproof compositions may be used.

EXAMPLE 1

Material

| | Parts by weight |
|---|---|
| A chlorinated rubber (Tornesit 125 c. p.) | 280 |
| A chlorinated diphenyl (Aroclor #1254) | 80 |
| Paraffin wax | 40 |
| Butyl phthalyl butyl glycollate (Santicizer B–16) | 50 |
| Dammar gum | 1 |
| Stearic acid | 5 |

EXAMPLE 2

Material

| | Parts by weight |
|---|---|
| Ethyl cellulose (high viscosity) | 50 |
| A chlorinated diphenyl (Aroclor #1254) | 50 |
| Paraffin | 25 |
| Stearic acid | 6 |
| Shellac gum | 3 |

EXAMPLE 3

Material

| | Parts by weight |
|---|---|
| Ethyl cellulose (high viscosity) | 50 |
| A chlorinated diphenyl (Aroclor #1254) | 50 |
| Paraffin | 15 |
| Dammar gum | 5 |

EXAMPLE 4

Material

| | Parts by weight |
|---|---|
| Dibenzyl cellulose (high viscosity) | 100 |
| Paraffin | 10 |
| Butyl phthalyl butyl glycollate (Santicizer B–16) | 20 |
| Dammar gum | 6 |

EXAMPLE 5

Material

| | Parts by weight |
|---|---|
| Pale crepe rubber | 15 |
| Paraffin wax | 85 |

EXAMPLE 6

Material

| | Per cent |
|---|---|
| A plasticized vinyl resin (Vinylite—VU 1523 natural) | 100 |

The compositions set forth in the above illustrative examples may be uniformly mixed and compounded in any suitable manner; for example we may compound the ingredients given in Example 1 by taking the chlorinated rubber, chlorinated diphenyl and paraffin wax and mixing them together on rolls, using cold rolls at the start and then warming them to about 50° C. after about one hour on the rolls. The dammar gum and stearic acid are then added and the rolls being then held at from 30 to 35° C.

After the ingredients have been uniformly compounded, the moistureproof composition is then calendered in the form of a thin film 1 and applied to a continuous sheet or web 2 of tissue-like vegetable fiber or the like or of thin, long-fibered, bibulous paper such as for example, Japanese grass paper, and caused to adhere thereto by a slight pressure and heat. Due to the characteristics of the moistureproof film or layer 1, it is caused to adhere to the paper 2 at the surface thereof and without any or substantially no penetration into the fibers or interstices thereof. The moistureproof layer 1 thus appears to adhere only to the external fibers of the paper sheet 2. The sheet, therefore, has one side which is uncoated and hydrophilic in character, and the other side of which is coated with a moistureproof material to give a hydrophobic surface.

Figure 2:
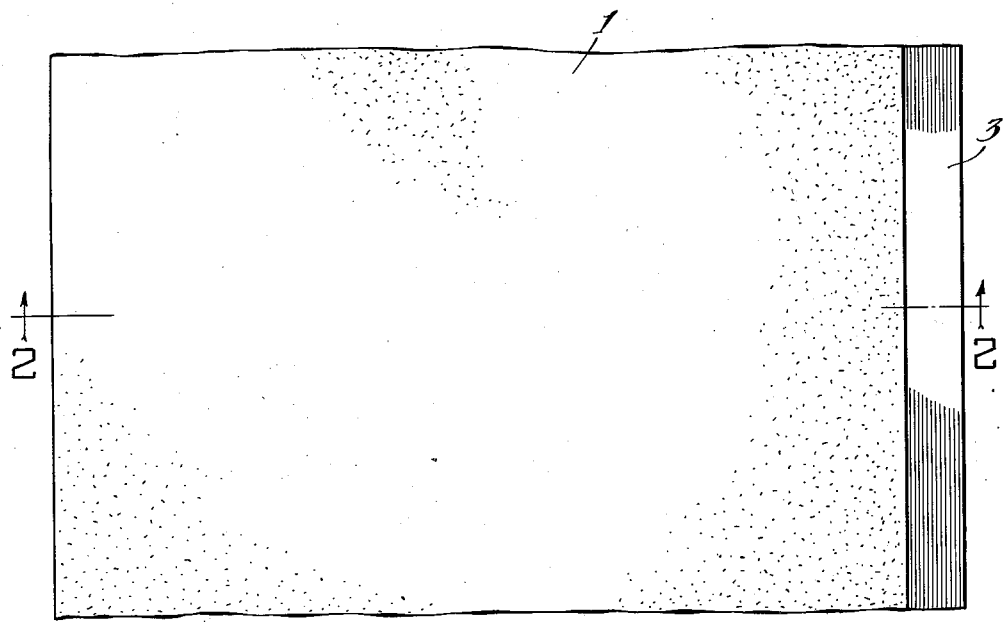
Fig. 2 is a plan view thereof showing the uncovered margin.
Figure 3:
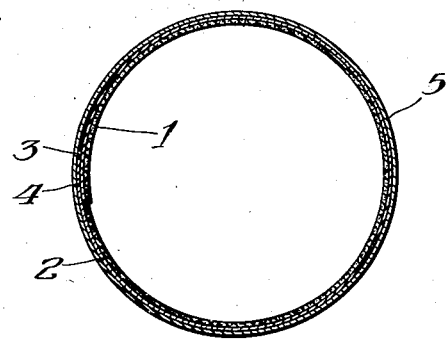
Fig. 3 is a transverse sectional view of the completed tubular casing showing the cellulose derivative impregnated paper and the moistureproof layer in section and exaggerated in thickness for clarity.

As clearly shown in Figs. 1 and 2, the moistureproof layer 1 is so applied that it is flush with one edge of the paper sheet 2. At the other edge a clear paper space or margin 3 is provided to facilitate the formation of a strong seam when the paper is formed into a tube in a manner to be described. The width of the uncovered margin 3 may, of course, vary but we prefer that it be of a width which corresponds closely with the width of the seam desired.

The paper sheet 2 with the film or layer of the moistureproof material 1 firmly adhering to it may be now formed into a tube. The tube may be formed with the moistureproof film on either the inside or outside. In our preferred practice, the paper sheet is bent into tubular form so that the moistureproof layer 1 is on the inside and with the uncovered margin 3 of the paper lapping over the outside of the other edge of the paper to form an overlapped seam 4. A small amount of a solution of a cellulose derivative or other suitable adhesive material is now introduced between the lapped surfaces of the paper to cause them to adhere and the entire outer surface of the tube thus formed is covered with a coating or layer of the desired cellulose derivative. This coating is permitted to penetrate into the fibers and interstices of the paper and the tube is then dried and is ready for use. If the cellulose derivative used as the coating solution is viscose, the tube, after thorough saturation of the fibers and filling of the interstices of the paper, is subjected to the action of a coagulating and regenerating bath or baths and is washed and dried as described in the above-mentioned prior applications. In general, any of the well-known precipitating and regenerating baths may be employed as for example, the baths mentioned in the above identified co-pending applications. Satisfactory results have been obtained with a precipitating and regenerating bath containing approximately 2.5% $H_2SO_4$, 20% $(NH_4)_2SO_4$ and 15% $Na_2SO_4$. The temperature of the precipitating and regenerating bath, wash water and drying must be, of course, controlled to avoid undue softening of the moistureproof layer and consequent sticking thereof when the tube is flattened. If desired, a suitable hygroscopic material such as glycerin may be applied to the coating before drying to enhance its flexibility. The coating thus formed of regenerated cellulose is hydrophilic in nature, so that with the moistureproof coating on the inside, the resulting tube has a hydrophilic outer surface portion, and a hydrophobic inner surface portion. Tubes of this structure have the inherent property that when they are wet with water, filled with liver sausage and dried, the outer hydrophilic portion of the tube shrinks against the non-shrinking hydrophobic inner portion and against the sausage meat, so as to give a firm and tightly packed sausage.

It is of course obvious that the viscosity of the cellulose derivative coating material may be varied to meet the desired needs, but since the penetration time of a solution obviously depends upon its viscosity, we prefer to use a cellulose derivative of a sufficiently low viscosity so that the penetration time is reduced to a minimum. The coating layer 2 may be formed from any of the well-known cellulose derivatives such as, for example, viscose, cellulose nitrate, cellulose acetate or similar cellulose esters, glycol cellulose or equivalent cellulose ethers.

We claim:

1. A method of forming a moistureproof tubular sausage casing comprising—superimposing a film of thermoplastic moistureproof material on to one side of a tissue-like sheet of paper, pressing the film against the paper to cause it to adhere to said paper, forming the moistureproofed paper sheet into a tube and coating the other side of the paper with a hydrophilic bonding material.

2. A method of forming a moistureproof tubular sausage casing comprising calendering a thermoplastic moistureproof material into a thin sheet, superimposing said sheet onto one side of a thin, long fibered paper, pressing the film against the paper to cause it to adhere thereto, forming the paper into a tube with the moistureproof film on the inside and impregnating and coating the paper with a hydrophilic cellulose derivative.

3. A method of forming a moistureproof tubular sausage casing comprising superimposing a film of thermoplastic moistureproof material on to one side of a relatively wider, thin, long fibered paper to provide an uncovered margin, pressing the film against the paper to cause it to adhere to the surface thereof, forming the paper into a tube with the moistureproof film on the inside and with the uncovered margin lapping the outside of the opposite edge of the paper, securing the lapped edges of the paper with an adhesive material, filling the interstices of the paper with viscose and subjecting the tube to a precipitating and regenerating treatment to regenerate cellulose whereby a moistureproofed paper tube is formed with the interstices of the paper filled with regenerated cellulose.

4. A casing suitable for sausage and other edible products comprising a tube of flexible non-fibrous hydrophilic film having imbedded therein a fibrous web material, and a layer of moistureproof material covering and adhering to one side of the fibrous web material.

5. A casing suitable for sausage and other edible products comprising a tube of fibrous cellulose, web material having a layer of moistureproof material covering and adhering to said fibrous material on one side thereof; and a hydrophilic cellulose derivative throughout the fibers and interstices of the fibrous web on the other side thereof.

6. A casing suitable for sausage and other edible products comprising a tube of paper having a continuous lining of moistureproof material adhering to said paper substantially at its surface and on one side thereof, and regenerated cellulose throughout the fibers and interstices of the paper on the other side thereof.

7. A casing for sausage and like products comprising a tube, having a hydrophilic outer surface portion and comprising thin, long fibered paper impregnated with the regenerated cellulose, and a hydrophobic inner surface portion comprising a thin, flexible, moistureproof film, covering and adhering to the inner surface of the tube, said moistureproof film comprising a substance selected from the group consisting of rubber derivative resins and vinyl resins.

8. A casing for sausage and like products comprising a tube, the outer surface portion of which is hydrophilic and comprises thin, long fibered paper impregnated with a regenerated cellulose, the inner surface portion of which is hydrophobic and comprises a flexible, moistureproof film of a rubber derivative resin, covering and adhering to the inner surface of the tube.

9. A casing for sausage and like products comprising a tube, the outer surface of which is hydrophilic and comprises thin, long fibered paper impregnated with a regenerated cellulose, the inner surface portion of which is hydrophobic and comprises a flexible, moistureproof film of rubber hydrochloride, covering and adhering to the inner surface of the tube.

10. A casing for sausage and like products comprising a tube, the outer surface portion of which is hydrophilic and comprises thin, long fibered paper impregnated with a regenerated cellulose, the inner surface portion of which is hydrophobic and comprises a flexible, moistureproof film of a cellulose derivative and a wax, covering and adhering to the inner surface of the tube.

11. A casing for sausage and like products comprising a tube, the outer surface portion of which is hydrophilic and comprises thin, long fibered paper impregnated with a regenerated cellulose, the inner surface portion of which is hydrophobic and comprises a flexible, moistureproof film of rubber and a wax, covering and adhering to the inner surface of the tube.

12. A casing suitable for sausage and like products comprising a tube of paper having a continuous moistureproof lining of rubber hydrochloride adhering to said paper substantially at its surface and on the side of the paper forming the interior wall of the tube, and regenerated cellulose throughout the fibers and interstices of the paper.

JOHN PAUL SMITH.
WILLIAM FRANKLIN HENDERSON.